(12) United States Patent
Nadgauda

(10) Patent No.: US 9,894,487 B1
(45) Date of Patent: Feb. 13, 2018

(54) RULE-BASED TOOL FOR TRACKING CO-LOCATED OBJECTS

(71) Applicant: Salil S. Nadgauda, Hoboken, NJ (US)

(72) Inventor: Salil S. Nadgauda, Hoboken, NJ (US)

( * ) Notice: Subject to any disclaimer, the term of this patent is extended or adjusted under 35 U.S.C. 154(b) by 0 days.

(21) Appl. No.: 15/550,360

(22) PCT Filed: Mar. 3, 2016

(86) PCT No.: PCT/US2016/020555
§ 371 (c)(1),
(2) Date: Aug. 10, 2017

(87) PCT Pub. No.: WO2016/141116
PCT Pub. Date: Sep. 9, 2016

Related U.S. Application Data

(60) Provisional application No. 62/128,809, filed on Mar. 5, 2015.

(51) Int. Cl.
*G08B 13/14* (2006.01)
*H04W 4/02* (2018.01)
*G01C 21/00* (2006.01)
*G01S 19/42* (2010.01)

(52) U.S. Cl.
CPC .......... *H04W 4/028* (2013.01); *G01C 21/005* (2013.01); *G01S 19/428* (2013.01)

(58) Field of Classification Search
CPC .................................. G06Q 10/00; G08B 1/00
See application file for complete search history.

(56) References Cited

U.S. PATENT DOCUMENTS

| 2001/0052851 | A1  | 12/2001 | Mathias et al. |
| 2006/0061488 | A1  | 3/2006  | Dunton |
| 2006/0132304 | A1* | 6/2006  | Cabell ..................... G06F 21/88 340/539.23 |
| 2012/0116861 | A1  | 5/2012  | Dobyns |
| 2013/0103496 | A1* | 4/2013  | Shekar ............... G06Q 30/0201 705/14.53 |

OTHER PUBLICATIONS

International Search Report, corresponding to Int'l Application No. PCT/US2016/020555 (dated Jun. 29, 2016).
Written Opinion of the International Searching Authority, corresponding to Int'l Application No. PCT/US2016/020555 (dated Jun. 29, 2016).

* cited by examiner

*Primary Examiner* — Shirley Lu
(74) *Attorney, Agent, or Firm* — Weitzman Law Offices, LLC

(57) ABSTRACT

A tool and computer-implemented method for not only determining co-location of items based on rules, but also automatically generating rules based upon arrival at some location in the future. Rules are created both based upon items to be located, as well as combined with positional information.

21 Claims, 15 Drawing Sheets

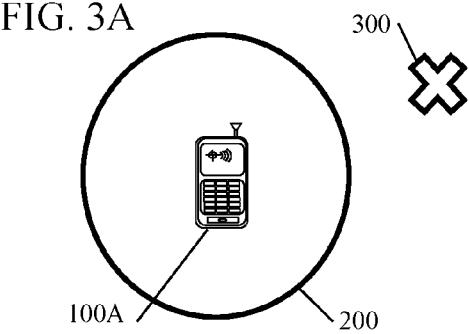
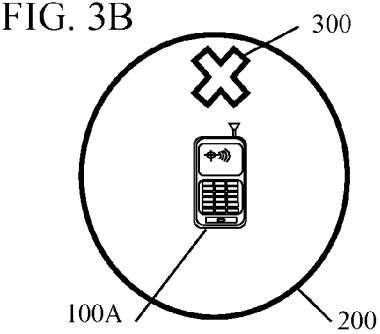
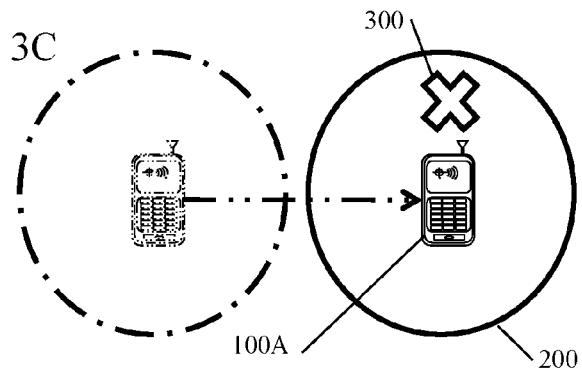
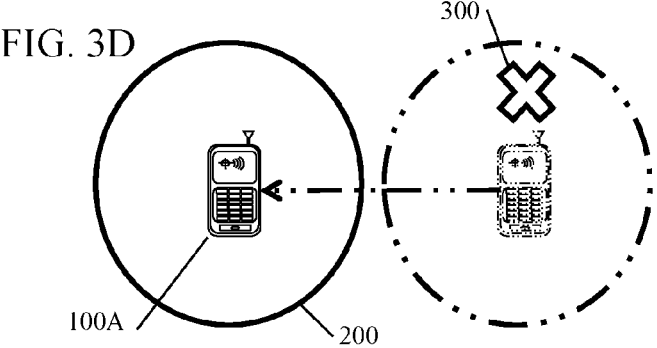
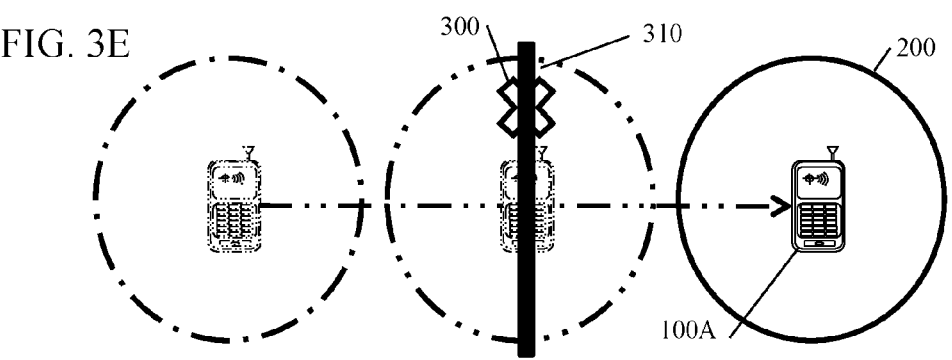

1100

User Name

Password

Log In

Sign up

Available Items

☑ Child Seat
  Location: Far 🔔

☑ Pet Leash
  Out of Range 🔔

☑ Car
  Location: Far 🔔

☑ Home
  Location: Far 🔔

☑ Keys
  Location: Far 🔔

☑ Computer
  Location: Far 🔔

Create an Alert by Location

| Location | Condition | Available Items |
|---|---|---|
| ☑ Current (House) | ☐ A | ☑ Child Seat Location: Far 🔔 |
| Stored Location | ☐ B | ☑ Pet Leash Out of Range 🔔 |
| ☐ Office | ☐ C | ☑ Car Location: Far 🔔 |
| ☐ Car | ☐ D | ☑ Home Location: Far 🔔 |
| ☐ School | ☐ E | ☑ Keys Location: Far 🔔 |
| Create New | | ☑ Computer Location: Far 🔔 |

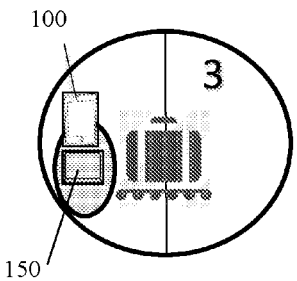
FIG. 13A
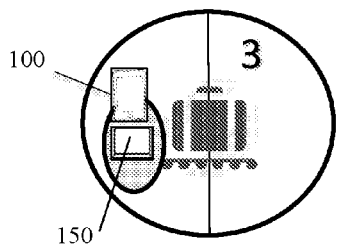
FIG. 13B
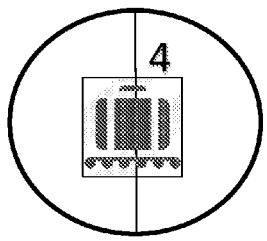
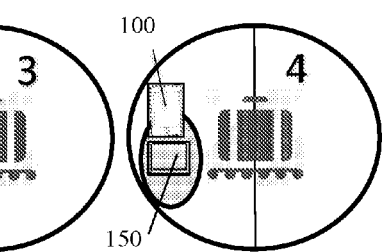
FIG. 13C
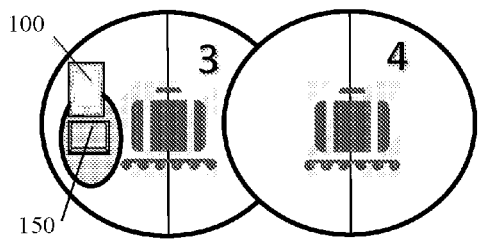
FIG. 13D
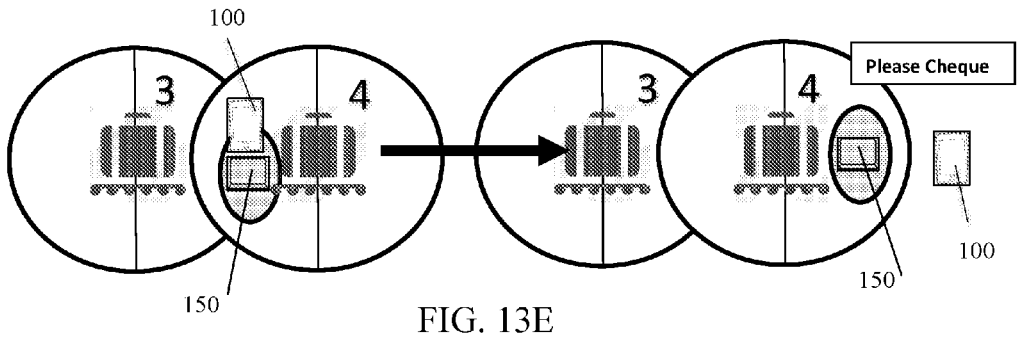
FIG. 13E

RULE-BASED TOOL FOR TRACKING CO-LOCATED OBJECTS

CROSS REFERENCE TO RELATED APPLICATION

This application claims the priority benefit of U.S. provisional patent application No. 62/128,809, filed Mar. 5, 2015, which is incorporated herein by reference in its entirety as if fully set forth herein.

FIELD OF THE INVENTION

This disclosure relates generally to a tool for determining co-location of items based upon rules and, more particularly, to a tool for determining co-location of items that is capable of automatically generating temporary rules based upon arrival at some location in the future.

BACKGROUND

A person does not just consist of himself or herself, but also moves around with a collection of inanimate objects (e.g., a wallet, purse, keys, laptop, luggage, etc.) and also, at times, animate objects for which they are responsible (e.g., dependent children/adults, pets etc.). Keeping track of all these items and getting them from one place to another can, at times, be an overwhelming task, particularly in the distracted world that we live in.

Some representative examples include: every weekday morning from 7 am-9 am, a person going to work needs to leave the house with keys and a computer, and that same person, later leaving work at night, needs to have the same keys and computer to bring home; a parent, every school day, needs to leave the house with the child and all the child's school supplies; a technician going to a job site needs to have all the tools in his or her tool case; a surgeon, before commencing surgery, needs certain medical instruments present; a person checking out of a hotel room does not want to leave any items behind; and a person exiting a taxi does not want to forget his or her wallet.

However, not only is it difficult to track routine occurrences, but people are particularly prone to forget things while in unfamiliar situations, such as, for example, while traveling on vacation or on a business trip. In this case, the situation can be catastrophic, and not easily recoverable, since it might not be possible to simply return to pick up the missing item, because of distance or it may have been left in a public location, which means someone may take it.

BRIEF SUMMARY

In one aspect of this disclosure, a tool and computer implemented method for monitoring the presence of items, includes at least one receiver configured to receive information transmitted from at least two transmitters, and one or more processors coupled to non-transient memory and the at least one receiver. A rule-based item co-location application comprising program instructions, stored in non-transient memory, when executed by the one or more processors, causes the one or more processors to store in non-transient memory at least one rule relating to co-location of at least one item and the tool upon arrival at a future destination. Location-based information transmitted from a first transmitter located in proximity to the future destination is received and arrival at the future destination is determined to have occurred when the location-based information is received. In response to the determination that arrival has occurred, the at least one item co-location rule is executed. Item-based information transmitted from a second transmitter associated with the at least one item is received and, in response to the determination that arrival has occurred, location-based information transmitted from the first transmitter and item-based information transmitted from the second transmitter are monitored. Based on the monitored location-based information, the tool is identified as no longer at the future destination when the tool is no longer receiving location-based information from the first transmitter. In response to identifying when the tool is no longer at the future destination, determine, based on the monitored item-based information transmitted from the second transmitter, whether the at least one item is co-located with the tool, wherein the at least one item is determined not to be co-located with the tool when the tool is no longer receiving item-based information from the second transmitter. In response to the determination whether the at least one item is co-located with the tool, at least one alert is generated if the at least one item is not co-located with the tool.

In another aspect of this disclosure, a tool is disclosed for allowing item co-location rules to be automatically generated based upon receipt of data related to a pending arrival at a future location. The tool includes at least one receiver configured to receive information transmitted from at least two transmitters and one or more processors coupled to non-transient memory and the at least one receiver. A rule-based item co-location application comprising program instructions, is stored in non-transient memory, that, when executed by the one or more processors, causes the one or more processors to receive the data related to the future location, wherein the data comprises at least location identification information that can be used to determine arrival at the future location. A rule relating to co-location of at least one item with the tool in the event that arrival at the future location occurs at a future time is automatically generate and store in non-transient memory. Location-based information transmitted from a first transmitter located in proximity to the future location is received and a determination is made that arrival at the future location has occurred when the location-based information is received. In response to the determination that arrival has occurred, the rule relating to item co-location is executed. Item-based information transmitted from a second transmitter associated with the at least one item is received. In response to the determination that arrival has occurred, location-based information transmitted from the first transmitter and item-based information transmitted from the second transmitter is monitored. Based on the monitored location-based information, the tool is identified as no longer at the future location when the tool is no longer receiving location-based information from the first transmitter. In response to identifying when the tool is no longer at the future location, based on the monitored item-based information transmitted from the second transmitter, a determination is made whether the at least one item is co-located with the tool, wherein the at least one item is determined not to be co-located with the tool when the tool is no longer receiving item-based information from the second transmitter. In response to the determination whether the at least one item is co-located with the tool, at least one alert is generated if the at least one item is not co-located with the tool.

The foregoing and following outlines rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which:

FIG. 3A-E show, in simplified form, five conditions associated with a physical location;

FIGS. 11A-11C show, in simplified form, illustrated screen shots of a GUI for a display screen on the tool;

FIGS. 13A-13E illustrate representative examples of ranging in the context of an airport.

DETAILED DESCRIPTION

This application discloses a tool for not only determining co-location of items (e.g., inanimate and animate objects) based on rules, but a tool that is also capable of automatically generating rules based upon arrival at some location in the future. However, before describing the tool, it is first helpful to view representative system architecture for the tool, as well as the technical problem that the tool solves.

Figure 1:
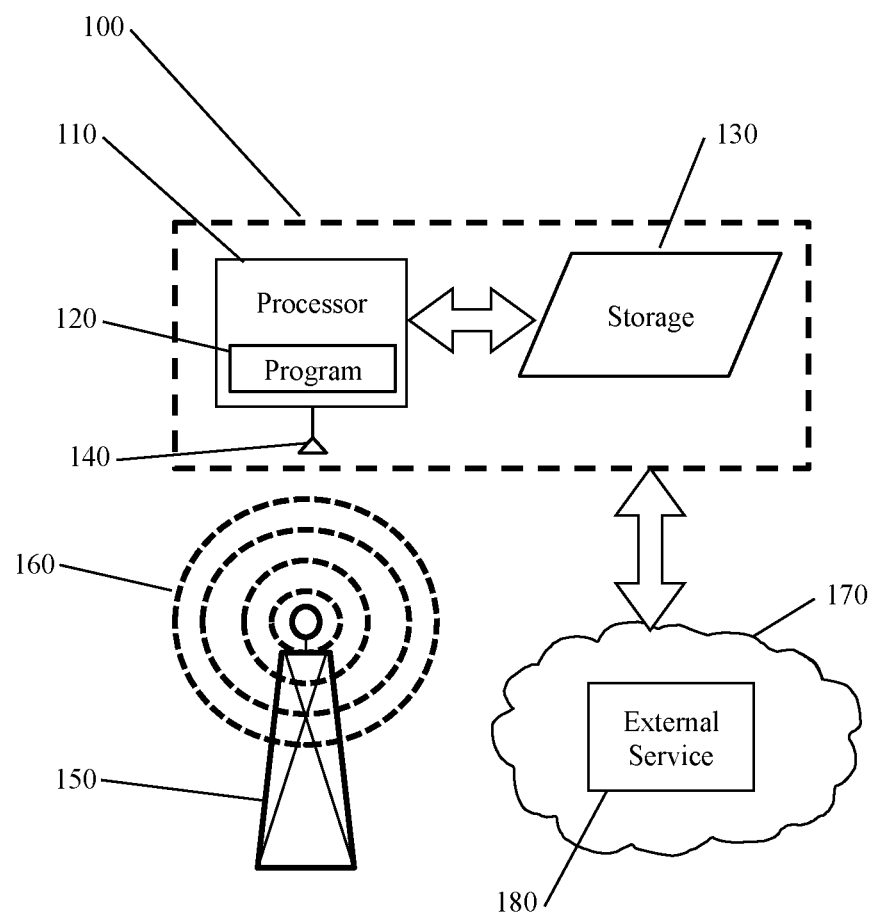
FIG. 1 shows, in simplified form, a system architecture of a tool used for tracking co-located objects based upon rules.

FIG. 1 shows, in simplified form, a system architecture of a tool 100 used for tracking co-located objects based upon rules, as well as for automatically generating rules based upon arrival at some location in the future. The tool 100 includes one or more processors 110 coupled to a non-transient program 120 that may be part of the processor 110 or part of the data storage 130, and one or more receivers 140 configured to receive location based information.

The tool 100 operates in an environment that has one or more co-located items or objects, each having associated with it a transmitter 150 that is capable of broadcasting a signal 160 that can be received by one or more receivers 140. A network 170 provides a two-way communication channel to the tool 100. Through the network 170, information can be exchanged with one or more external services 180. It is understood that the storage 130 could also be external to the tool 100 and a part of the network 170.

The one or more receivers 140 can be one or more of an RFID reader, a NFC communication component, wireless communication component (e.g., Bluetooth, RuBee, GBM, CDMA, GPR8, EDGE, UMTS, IEEE 802.11, IEEE 802.16, etc.), or a satellite receiver of GPS coordinates or other location based services provider.

In this regard, it should be understood that the communication protocols are representative of typical, known communication protocols for purposes of understanding. It is understood that other communication protocols, whether standard or proprietary, can be used to the same or similar effect for receiving location based information, again, the important aspect being the ability to receive location based information, not the particular communication protocol used.

Having described the system architecture, we will now briefly describe the technical problem solved by the tool 100. The technical problem is that a person does not just consist of himself or herself, but also moves around with a collection of inanimate objects (e.g., a wallet, purse, keys, laptop, luggage, etc.) and sometimes animate objects, for which they are responsible, such as (but not limited to) dependent children and/or adults, as well as pets. Keeping track of all these items or objects and getting them from one place to another can, at times, be an overwhelming task particularly in the distracted world that we live in and requires a technical solution.

As discussed above, representative daily situations may include: every weekday morning from 7 am-9 am, a person going to work needs to leave the house with keys and a computer and that same person, leaving work at night, needs to have the same keys and computer to bring home; a parent, every school day, needs to leave the house with the child and all the child's school supplies; a technician going to a job site needs to have all the tools in the technician's tool case required for the particular job; and a doctor, before commencing a medical procedure, needs certain medical instruments present for the procedure.

However, not only is it difficult to track routine occurrences, but people are particularly prone to forget things while in unfamiliar situations, such as while traveling on vacation or on a business trip.

The technical solution involves using transmitters 150 attached to or otherwise associated with items or objects that a person wants to co-locate (i.e., keep track of) readable by the tool 100 of FIG. 1 and establishing rules based upon arriving, departing and passing through or by a location.

The use of transmitters associated with an item (or a location) is becoming ubiquitous with the "Internet of Things" (IoT). For example, a popular transmitter 150 is the iBeacon®, which can be attached or affixed to items and readily extends location based services to the iOS® operating system for use with an iPhone®. The iBeacon® uses a Bluetooth low energy (BLE) signal to broadcast simple attributes for identification: a Proximity UUID (16 bytes), a Major (2 bytes) ID and a Minor (2 bytes) ID. In this particular case, the tool 100, with an appropriate program or software application 120, may be (but is not limited to) an iPhone® or other smart phone device, iPad®, tablet, or any other portable device configured with an appropriate receiver 140 and capable of executing the program 120.

For illustrative purposes, a smart phone graphic is used to represent the tool 100 in subsequent drawings. It is understood, however, that this represents the system architecture specified in FIG. 1 and does not indicate the need for additional capabilities beyond those specified in FIG. 1, unless specifically stated otherwise.

Rules must be established in order to co-locate items or objects having an associated transmitter 150. Rules may be associated with the tool 100 itself, or associated with the tool 100 and a physical location. There are four conditions (shown in FIGS. 2A-C and E) upon which an individual item or object (with associated transmitter 150) can be associated with the tool 100 by itself, and upon which rules can be created. Additionally, when combined with a physical location, there are five conditions (shown in FIGS. 3A-E) associated with a physical location and, thus, creating a total combinations of 20 conditions upon which rules can be created.

Figure 2A:
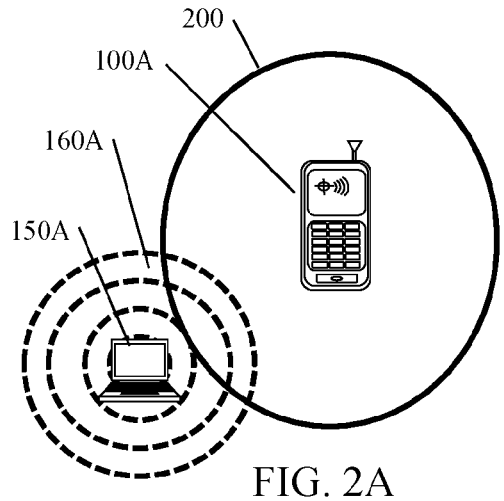
FIGS. 2A-2E show, in simplified form, four conditions associated with an item and the tool itself.
Figure 2B:
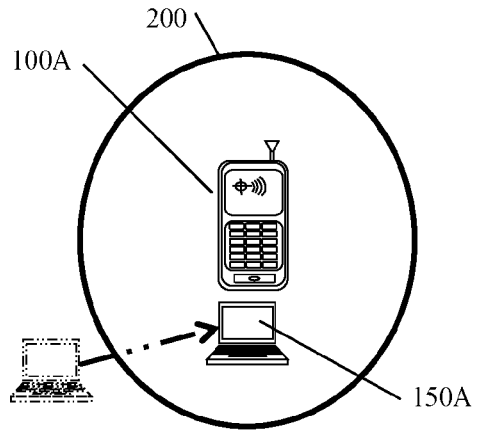
Figure 2C:
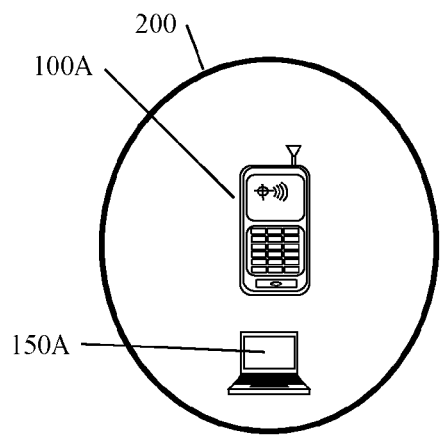
Figure 2D:
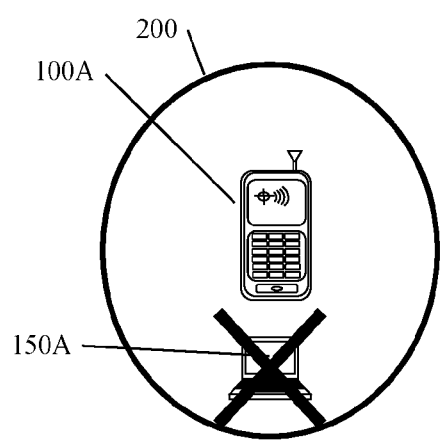

FIGS. 2A-E show, in simplified form, four conditions associated with an item or object 150A (having an associated transmitter 150) and the tool 100A itself, with FIG. 2D illustrating a representative state in which a condition should not be true.

FIGS. 2A-E illustrate a tool 100A with a proximity range 200 and an item or object 150A (having an associated transmitter 150) transmitting a signal 160A. Depending on the nature of the receiver within the tool 100A and the signal 160A being broadcast by the transmitter 150 associated with the item 150A, the proximity range 200 can either be a fixed distance (e.g., 5 ft., 10 ft., 15 ft., etc.) if the tool 100A has the ability to determine distance, or simply based upon the ability to detect an item 150A based upon the received signal strength being above a predetermined threshold. In the latter case, it is the strength of the signal 160A that determines the proximity range 200 and different items 150A having different signal strengths 160A would result in different proximity ranges 200 for each item, based upon each item's respective signal strength. For instance, an iBeacon® transmitter broadcasts a Bluetooth low-energy (BLE) signal that a software application running on a tool, such as (but not limited to) an iOS® device (e.g., iPhone®, iPad®, iPod®, etc.), can detect and approximate the distance or proximity to the iBeacon® transmitter based upon the received signal strength. Alternatively, in the former case, there are numerous known techniques for determining the distance between the item 150A and tool 100A, such as (but not limited to) timing the interval between two pulses or by using received signal strength from a known source, since it is known that signals decay with distance.

In this regard, it is understood that there are numerous methods for establishing a proximity range 200 that are known in the art and dependent on the receiver 140/transmitter 150 pairing and the type of signal 160A broadcast. The important aspect being the ability to determine whether an item 150A is either inside or outside the proximity range 200, and not the particular method utilized.

FIG. 2A shows, in simplified form, Condition-1, an item 150A outside the proximity range 200 of the tool 100A. Example: A person's wallet 150A is not with them and an alert is generated by tool 100A that their wallet is outside the proximity range 200 (and, therefore, possibly missing or forgotten).

FIG. 2B shows, in simplified form, Condition-2, an item 150A that has moved into the proximity range 200 of the tool 100A. Example: A person looking for a misplaced wallet 150A receives an alert generated by tool 100A when the wallet comes within the proximity range 200 of the tool 100A (e.g., within 10 ft. of the person's current location).

FIG. 2C shows, in simplified form, Condition-3, an item 150A that is within the proximity range 200 of the tool 100A. Example: A person has all the items 150A on their list that is needed for a vacation gathered together and a confirmation is generated by tool 100A that all the items 150A are present and the person is ready to go.

FIG. 2D shows, in simplified form, a specific state of Condition-3, an item 150A is within the proximity range 200 of the tool 100A, but is not supposed to be there (as represented by the "X" drawn through the item 150A). Example: A person has her spouse's briefcase with her and it is during the time of day that her spouse should have his briefcase at work. An alert may be generated by tool 100A to alert the person that she may mistakenly have her spouse's briefcase.

It is worth noting that, like Condition-3 and its special case as represented in FIG. 2D, all of the conditions related to item 150A proximity to the tool 100A can have two states: one in which the condition should be true and one in which the condition should not be true.

Figure 2E:
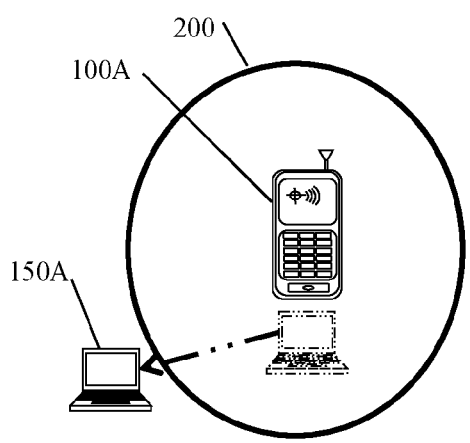

Continuing with the additional conditions related to item proximity to the tool 100A, FIG. 2E shows, in simplified form, Condition-4, an item 150A has left the proximity range 200 of the tool 100A. Example: A person's dog is now more than 25 feet away from him and an alert is generated by tool 100A.

As an optional feature, the tool 100A may be configured to generate an alert, such as (but not limited to) generating an audible alarm, ring tone or sound, if the user cannot locate the tool 100A while within range of the item 150A transmitting the signal 160A. For instance, some commercially available transmitters 150, such as TrackR®, have a button on the transmitter that causes the smart phone on which the TrackR® application is running to ring. Similarly, if the transmitter 150 has the capability of generating an alert (e.g., an audible sound or light), the tool 100A can be configured to cause the transmitter 150 to generate an alert if the user is unable to locate the item 150 associated with the transmitter and the tool is within range of the item.

Condition-1 through Condition-4 described above can be combined with a physical location to create an even more robust condition set, to which rules can be applied. FIGS. 3A-3E show, in simplified form, five conditions associated with a physical location. Included with the discussion below of five conditions associated with a physical location will be an illustrative, representative example of these conditions combined with at least one of Condition-1 through Condition-4. The particular combined conditions are merely illustrative, as each of the five conditions associated with a physical location could be combined with any of Condition-1 through Condition-4.

FIGS. 3A-3E illustrate a tool 100A with a proximity range 200 and a physical location 300. The proximity to a physical location 300 can be determined based on GPS or other location based services, or the location 300 itself can broadcast a signal in the same manner that item 150A in FIG. 2A can broadcast a signal 160A. In the case of a broadcast signal by the location 300 itself, all of the discussion related to determining proximity is also applicable if the physical location 300 is broadcasting a signal.

FIG. 3A shows, in simplified form, Condition-A, physical location 300 is outside the proximity range 200 of tool 100A. Example of Condition-A and Condition-2 combined: A person is not in her car, but her daughter's car seat 150A is with her.

FIG. 3B shows, in simplified form, Condition-B, physical location 300 is within the proximity range 200 of tool 100A. Example of Condition-B and Condition-1: A person, in a taxicab heading for vacation, does not have his wallet 150A and an alert is generated by tool 100.

FIG. 3C shows, in simplified form, Condition-C, physical location 300 is now detectable within the proximity range 200 of tool 100A by virtue of the tool moving closer to physical location 300. Example of Condition-C and Condition-4: A person has arrived at her front door and her pet 150A has just wandered off.

FIG. 3D shows, in simplified form, Condition-D, physical location 300 is no longer detectable within the proximity range 200 of tool 100A by virtue of the tool moving farther away from physical location 300. Example of Condition-D and Condition-3: A person, who just left his house with his child's backpack 150A, is not the person that brings his child to school and an alert is generated by tool 100.

FIG. 3E shows, in simplified form, Condition-E, which is a special form of Condition-D referred to as a "gate" 310, where the physical location 300 is no longer detectable within the proximity range 200 of tool 100A by virtue of the tool moving away from the physical location 300 in such a manner as to pass through/by the physical location 300. Representative examples of a gate 310 associated with a physical location 300 may be (but are not limited to) a transmitter placed at someone's front door or incorporated into the lock of hotel room door. Example of Condition-E and Condition-1: A person receives an alert generated by tool 100A when he exits his hotel room at the end of a stay without all of the items 150A he arrived with.

While it can be assumed based upon time of day or other attributes that a person has passed through/by a "gate" 310 based on simply coming within range of the location 300, in order to determine that the person has passed through/by a "gate" rather than simply having entered and exited the same way, the tool 100A needs to determine its physical orientation relative to the physical location 300. This can be determined using, for example, a compass or other orientation device incorporated within the tool 100A, so that the route of travel may be monitored. The transmitter itself could broadcast more than one signal that are physically separated from one another and orientation can be determined by the tool 100A based on which signal is received first. Additionally, if the tool 100A incorporated an accelerometer, gyroscope or other device for measuring changes in motion, the tool 100A can determine whether the person continued on the same (or roughly the same path) when entering and exiting the physical location 300.

In this regard, it is understood that the techniques described above for determining that someone passed through/by a "gate" 310 are representative techniques for purposes of understanding only. It is understood that other techniques, whether standard or proprietary, can be used to the same or similar effect, again, the important aspect being the ability to determine that someone passed through/by a "gate," not the particular technique used.

It is also worth noting that similar techniques for Condition-E can also be applied to create an additional condition between the item 150A and the tool 100A, for instance, whether or not the item or object 150A leaves in a different orientation than it arrives. This additional condition may, at times, be useful, in spite of the fact that both the item and tool are anticipated to be non-stationary.

It should also be noted that when additional items 150A are paired together for purposes of determining co-location, then the total number of possible conditions upon which a rule can be based is $20^{(\# \ of \ items)}$. As such, combined rules, such as, for example, whether a person is exiting a location 300 with all of the items 150A that she entered with, are often suitable for most purposes and rules only need to be created for the conditions that are useful to a particular situation and not for every possible condition.

Indeed, there may be situations where a rule to be applied by the tool 100A may/may not be applicable depending upon the location. The tool 100A may be configured to enable or disable alerts in certain locations based upon Wi-Fi or GPS location.

In addition, several of the examples described above made reference to specific times and dates. As an option, a calendar may be incorporated within the tool 100A, including date and time capabilities for use in writing/creating rules. The calendar may be used to indicate when a particular rule is valid or not valid. For instance, a person may not want an AM work weekday rule ensuring the laptop is not left at home, to be active on the weekend when the person is not going to work.

User-defined rules may be created using the software application 120 running on the tool 100 and stored in local storage 130 or an external database that the tool can communicate with. The software application 120, based upon the region state of the location transmitter and regions state(s) of the associated items, determines if an alert should be broadcast to the user. As region entry/exit state changes, any rule associated with a designated item 150A being monitored has its internal attributes updated. Based upon the combination of region attributes, a rule is placed in active state. Once activated, any future region change affecting the rule can trigger an alert if the predefined conditions are met.

Figure 4A:
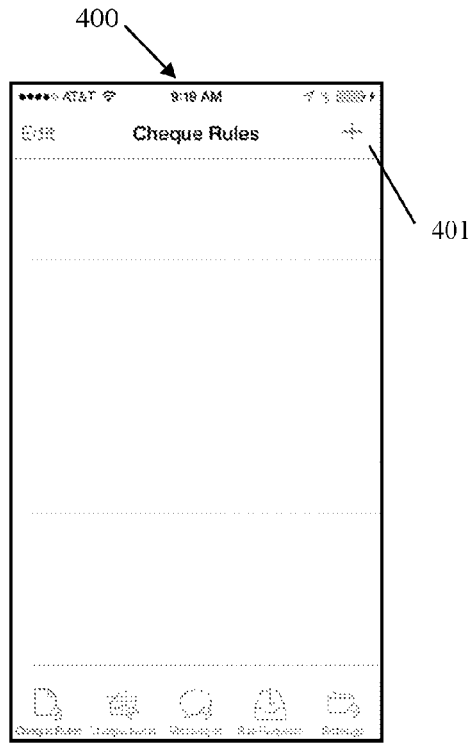
FIGS. 4A-4F show, in simplified form, various screen shots of a graphical user interface (GUI) for a display screen on the tool that allows the user to create and store user-defined rules.
Figure 4B:
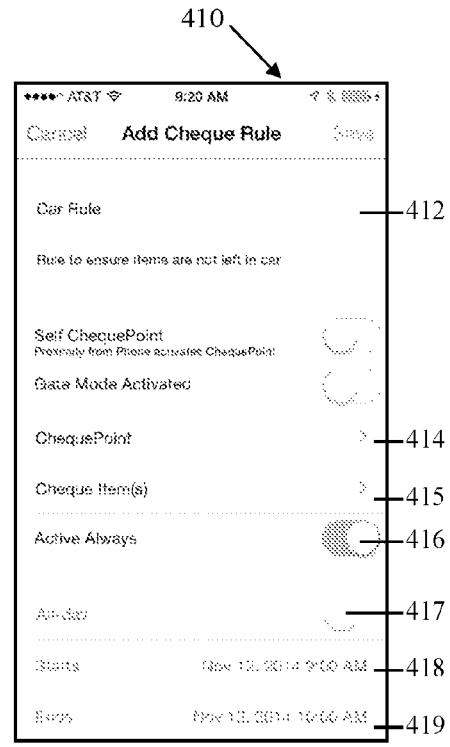
Figure 4C:
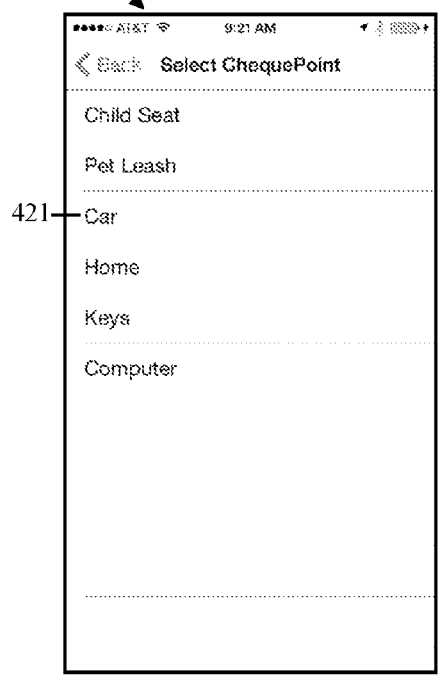

An illustrative example of how the tool 100 can be used to track co-located items based upon rules is provided below. For example, let's assume that a user does not want to leave items that the user has brought into a car when exiting the car. The first step is to create and store one or more user-defined rules for the items to be monitored. FIGS. 4A-4F illustrate various screen shots of a graphical user interface (GUI) for a display screen on tool 100 that allows the user to create and store user-defined rules. Referring to FIG. 4A, the user may select the button 401 on GUI 400 to create a new rule. In FIG. 4B, the user may enter the name of the rule (e.g., "Car Rule") in the area 412 in the GUI 410. If the user selects button 414, then the GUI 420 of FIG. 4C is displayed and the user may designate in the rule the region or location where items are to be monitored. In this example, the user may select the button labeled "Car" 421 to designate the car as the region in which items are to be monitored. When the region or location is selected, the software application 120 automatically returns the user to the GUI 410 of FIG. 4B or, alternatively, the user may select the "Back" button to return to the GUI 410 of FIG. 4B.

Figure 4D:
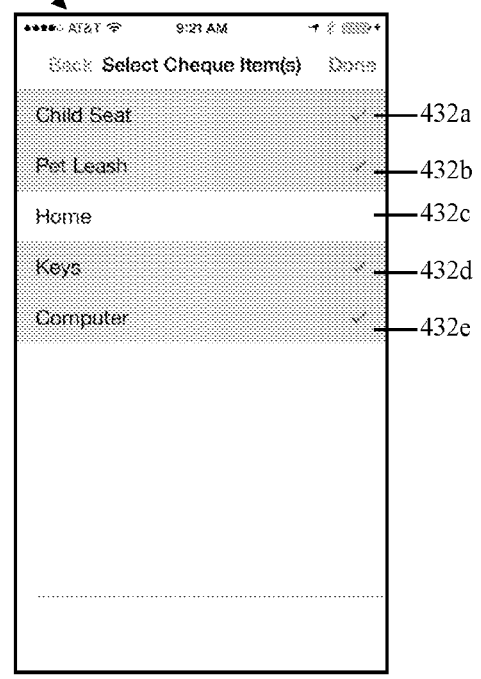

If the user selects button 415 on the GUI 410, then the GUI 430 of FIG. 4D is displayed to permit the user to designate in the rule the items to be monitored. In this example, the user has selected the buttons labeled "Child Seat" 432a, "Pet Leash" 432b, "Keys" 432d and "Computer" 432e. Any button not selected, such as the button 432c labeled "Home," will not be monitored in the rule being created. When completed, the user may select the "Done" button to update the selected items in the rule and return the user to the GUI 410, which would appear as shown in FIG. 4E.

Figure 4E:
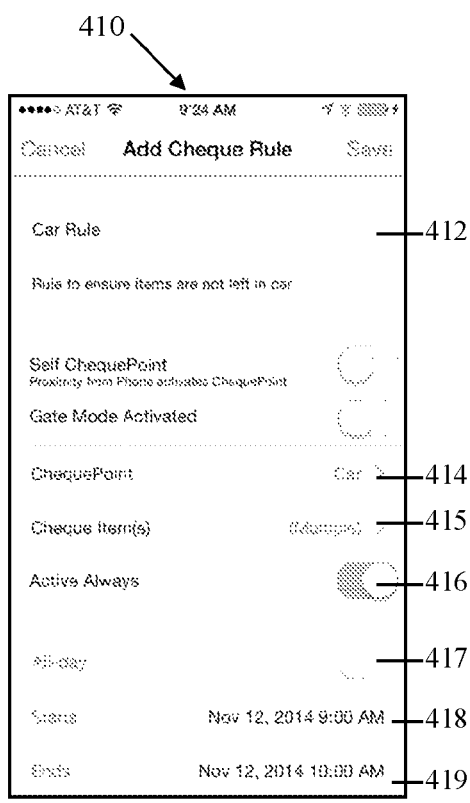
Figure 4F:
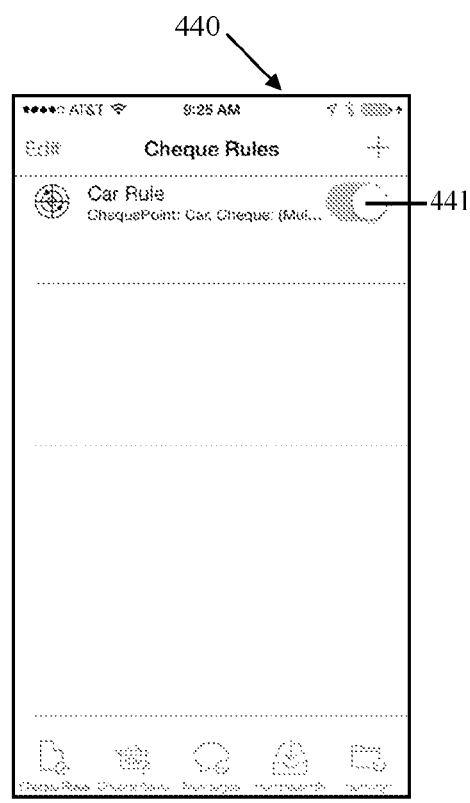

Referring to GUI 410 of FIGS. 4B and 4E, the user may select the button 416 to designate whether or not the rule is to be always active. If not, then the user may select the buttons 418 and 419 to input the date and time (or all day if button 417 is selected) when the rule commences and ends. Once completed, the user may select the button labeled "Save" in GUI 410 to save the rule in storage 130. The GUI 440 of FIG. 4F lists the saved rules (e.g., "Car Rule") and the user may select the button 441 to either keep the rule active or deactivate the rule.

Figure 5A:
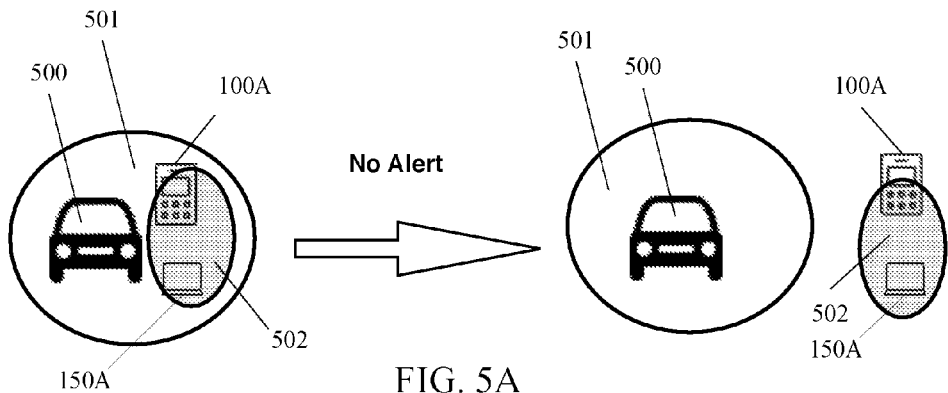
FIG. 5A shows, in simplified form, an illustrative example where a rule is satisfied and no alert is generated by the tool.
Figure 5B:
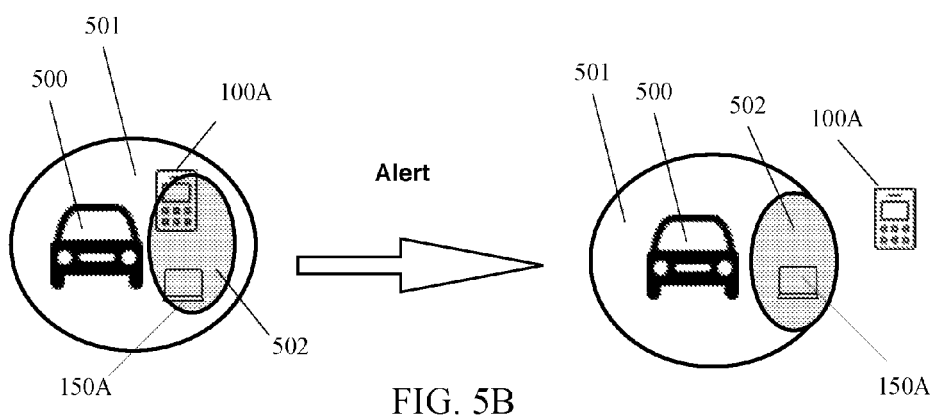
FIG. 5B shows, in simplified form, an illustrative example where a rule is not satisfied and an alert is generated by the tool.

FIGS. 5A and 5B illustrate how the rule created above would be implemented using tool 100A. Referring to FIG. 5A, the car 500 was designated in the rule as the location or region in which item(s) 150A are to be monitored. In this example, item 150A is a computer. The car 500 and computer 150A each have an associated transmitter 150 having a proximity range 501 and 502, respectively. The left hand portion of FIG. 5A illustrates the tool 100A (representing the user) within the proximity region 502 of the computer 100A, and both the computer 150A and tool 100A are within the proximity region 501 of the car 500. The saved rule (e.g., "Car Rule") is retrieved and initialized by the software application 120 when the tool 100A entered the region 501 of the car 500 while also being within the region 502 of computer 150A. The rule is active at that time.

Referring now to the right hand portion of FIG. 5A, as the user exits the car 500 with both the tool 100A and the computer 150A (i.e., the tool 100A remains within the proximity range 502 of computer 150A, and both the tool 100A and the computer 150A are no longer within the proximity range 501 of car 500), the software application 120 causes the rule to be deactivated gracefully as this is the desired result and no alert is generated or otherwise provided to the user.

Figure 6:
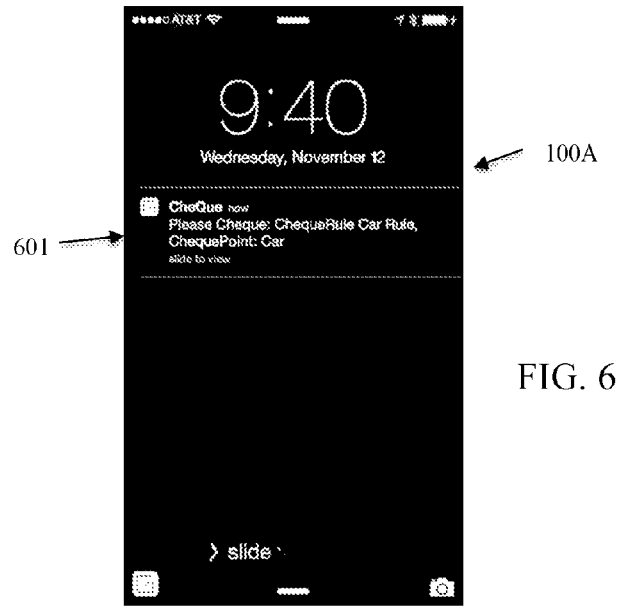
FIG. 6 shows, in simplified form, an illustrative example of an alert displayed to the user on the tool.

In contrast, FIG. 5B illustrates where the rule is not satisfied, as the computer 150A is left behind in the car 500 after the user exits the car with the tool 100A. Here, the left hand side of FIG. 5B is the same as in FIG. 5A, in which the tool 100A is within the proximity region 502 of computer 150A, and both the computer 150A and tool 100A are within the proximity region 501 of the car 500. The saved rule is active at this time. The right hand side of FIG. 5B represents the user exiting the region 501 of the car 500 without the computer 150A. The software application 120 running on tool 100A recognizes that the tool 100A is no longer within the region 501 of car 500, and that the tool 100A is also no longer within the region 502 of the computer 150A. With the violation of the rule, the software application 120 causes an alert to be generated and displayed (or otherwise communicated) to the user by the tool 100A. An illustrative example of an alert 601 generated by and displayed to the user on the tool 100A is shown in FIG. 6.

Figure 7A:
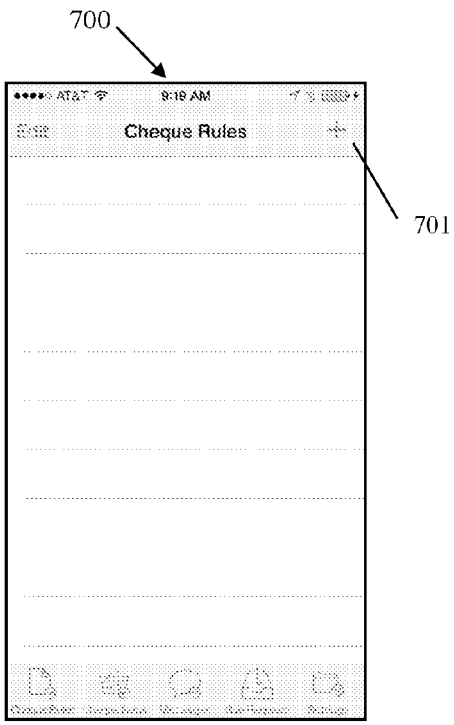
FIGS. 7A-7H illustrate various screen shots of a GUI for a display screen on the tool that allows the user to create and store user-defined rules by activating a "gate"
Figure 7B:
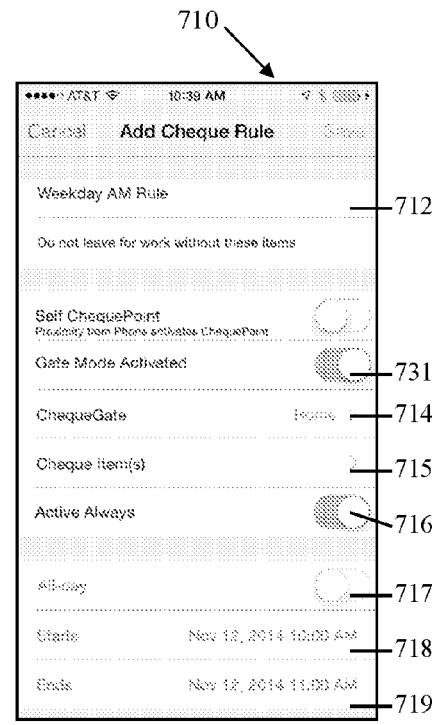
Figure 7C:
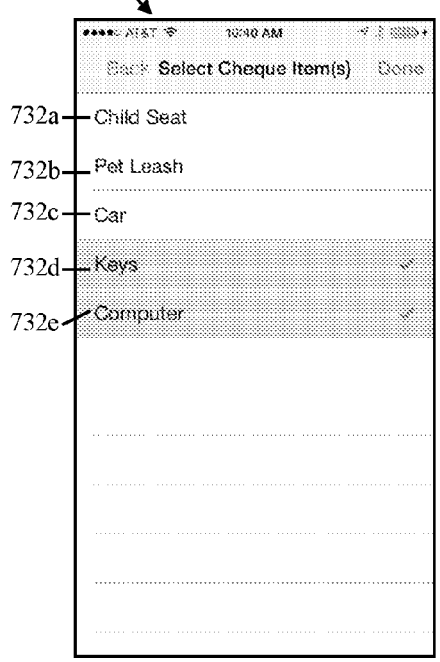
Figure 7D:
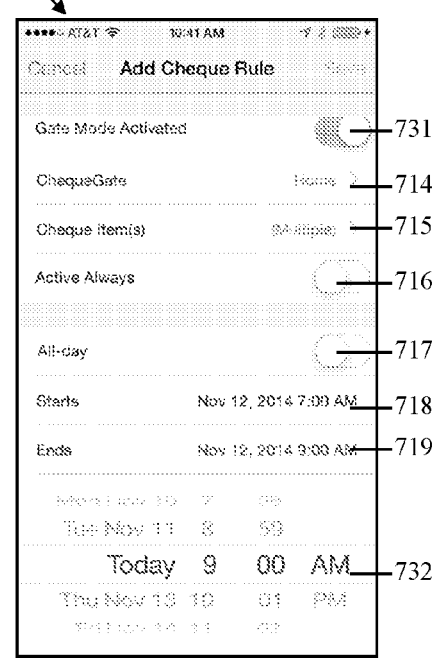
Figure 7E:
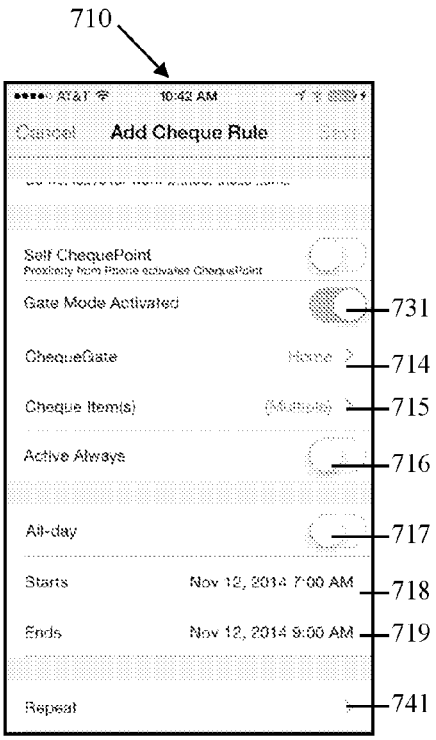
Figure 7F:
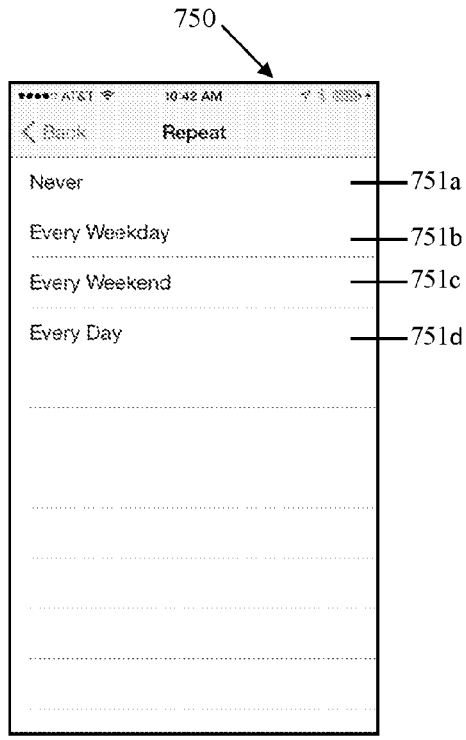

Another illustrative example of how the tool 100 can be used to track co-located items based upon rules using a "gate" is provided below. Let's assume that a user does not want to leave for work in the morning without his or her computer and keys. Like the preceding example, the user can create and store user-defined rules using the tool 100A. FIGS. 7A-7H illustrate various screen shots of a graphical user interface (GUI) for a display screen on tool 100 that allows the user to create and store user-defined rules. Referring to FIG. 7A, the user may select the button 701 on GUI 700 to create a new rule. In FIG. 7B, the user may enter the name of the rule (e.g., "Weekday AM Rule") in the area 712 in the GUI 710. The user can activate the "gate" mode by selecting the button 731 in GUI 710. The user may then designate the "gate" (e.g., home) by selecting the button 714 in GUI 710. When the user selects button 715 on the GUI 710, then the GUI 720 of FIG. 7C is displayed to permit the user to designate in the rule the items to be monitored. In this example, the user has selected the buttons labeled "Keys" 732d and "Computer" 732e. Any button not selected, such as the buttons labeled "Child Seat" 732a, "Pet Leash" 732b and "Car" 732c, will not be monitored in the rule being created. When completed, the user may select the "Done" button to update the selected items in the rule and return the user to the GUI 710, which would appear as shown in FIG. 7D.

Figure 7G:
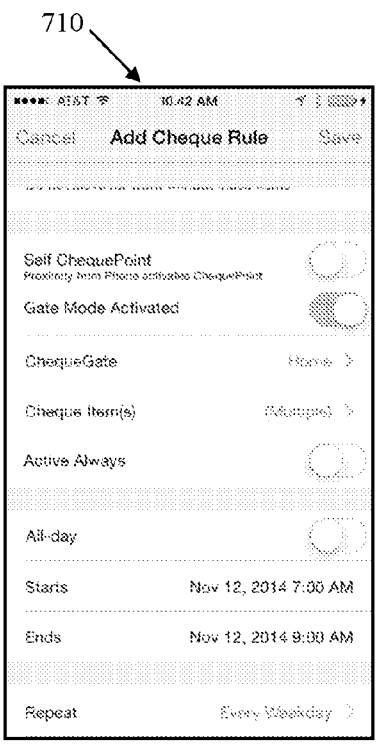
Figure 7H:
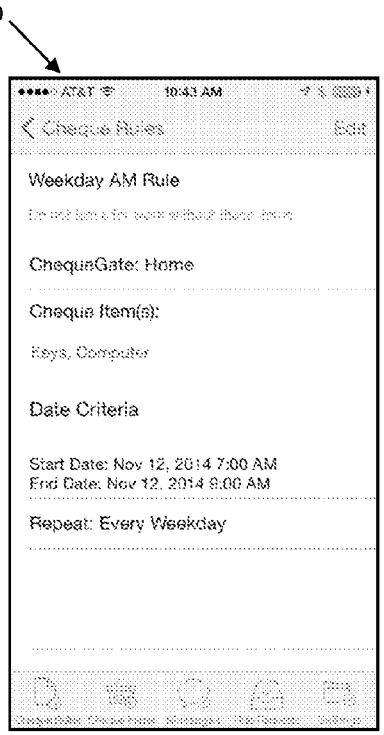

Referring to GUI 710 of FIG. 7D, the user may select the buttons 718 and 719 to input the date and time (or all day if button 717 is selected) when the rule commences and ends. The date and time may be selected using the day/time wheel 732. If the rule is to be repeated during other periods, the user may select the button 741 in GUI 710 of FIG. 7E, which will cause the GUI 750 of FIG. 7F to be displayed on the tool 100A. The user may then select the button 751a if the rule should "Never" repeat, button 751b to cause the rule to repeat "Every Weekday," button 751c to cause the rule to repeat "Every Weekend," or button 751d to cause the rule to repeat "Every Day." Once one of the buttons 751a. 751b, 751c, 751d is selected, the software application 120 updates the selection for the rule and returns the user to the GUI 710 as shown in FIG. 7G. Once all of the criteria for the rule is input, the user may select the button labeled "Save" in GUI 710 of FIG. 7G to save the rule in storage 130. The GUI 760 of FIG. 7H lists the criteria for the saved rule (e.g., "Weekday AM Rule").

Figure 8A:
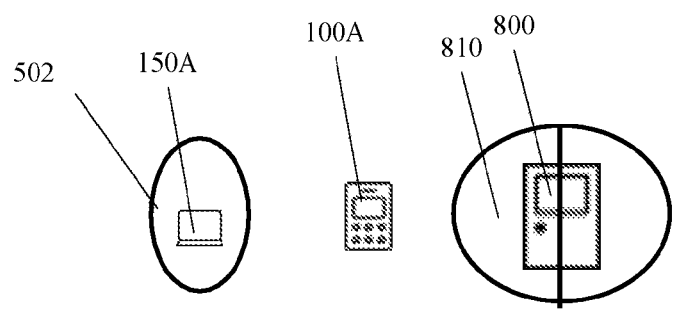
FIG. 8A shows, in simplified form, an illustrative example of a "gate" in which a rule has yet to be activated.
Figure 8B:
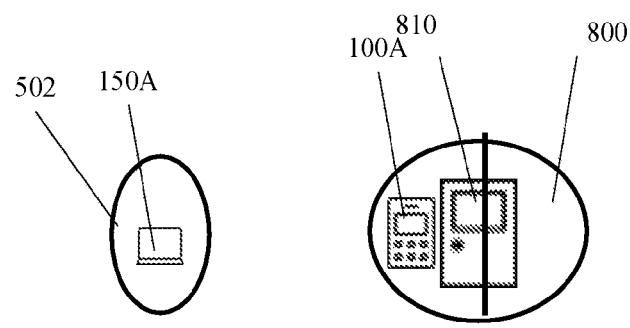
FIG. 8B shows, in simplified for, the illustrative example of the "gate" of FIG. 8A in which the rule is activated and satisfied.
Figure 8C:
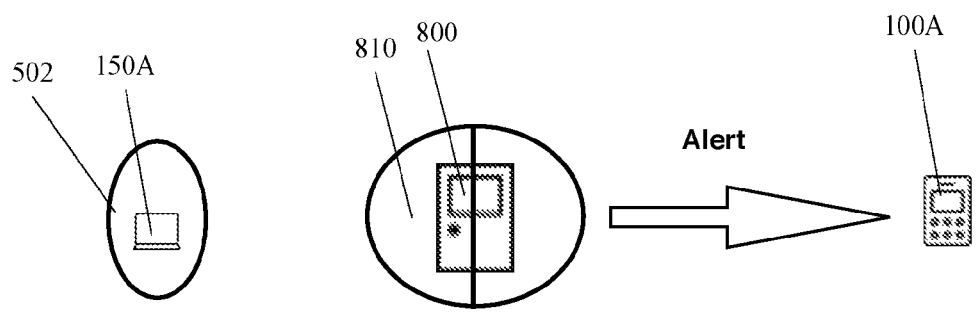
FIG. 8C shows, in simplified for, the illustrative example of the "gate" of FIG. 8A in which the rule is not satisfied and an alert is generated by the tool.

FIGS. 8A-8C illustrate how the rule created above would be implemented using tool 100A. In this example, the front door (or door lock) 800 of the user's home is set up as a "gate" having a region 810. The inside of the house is represented on the left side of the door line 800 and the outside on the right side of the door line. FIG. 8A shows the tool 100A (representing the user) inside the house and outside region 810 of door 800 and region 502 of computer 150A. In this example, the rule is not activated.

Referring to FIG. 8B, when the tool 100A enters region 810 of door 800 (with our without the computer 150A), the software application 120 causes the stored rule to be activated based on the proximity of the tool to the "gate" 800 (assuming that any temporal conditions (e.g., day of the week, date, time, etc. are satisfied) for the rule created by the user (FIGS. 7E and 7F) are satisfied).

Referring to FIG. 8C, when the tool 100A passes through the door 800 and exits the house, the software application 120 determines that the tool 100A passed through and exited the region 810 of gate 800, and determines whether the tool 100A is within the region 502 of computer 150A. If the tool 100A is within the region 502 of computer 150A, then the rule is satisfied and will be deactivated gracefully without an alert, as the user has both the tool 100A and computer 150A in his possession. If, however, the software application 120 determines that the tool 100A is not within the region 502 of computer 150A after the tool passes through the gate 800, then the rule would not be satisfied and the software application causes an alert to be generated on the tool 100A to alert the user that he has left the house without his computer 150A.

It is understood that temporary rules may be created to include items not owned by the user. Such temporary rules may be utilized, for instance, in temporary housing or transportation situations where a user wants to keep track of personal items in a context (location and time) owned by another party. Examples would be hotel rooms and taxis. A user upon exit would want to have the same items she brought into the hotel room (on check out date) or taxi. Rules associated with a hotel room could be implemented using, for instance, the hotel room door as the "gate" in a manner similar to the example discussed above and illustrated in FIGS. 8A-8C. Similarly, rules associated with a taxi could be implemented using, for instance, the "car" example discussed above and illustrated in FIGS. 5A-5B.

Having previously described the general nature of the rules that are related to Condition-1 through Condition-4 combined with Condition-A through Condition-E, a process flow related to rule execution is described below.

Figure 9:
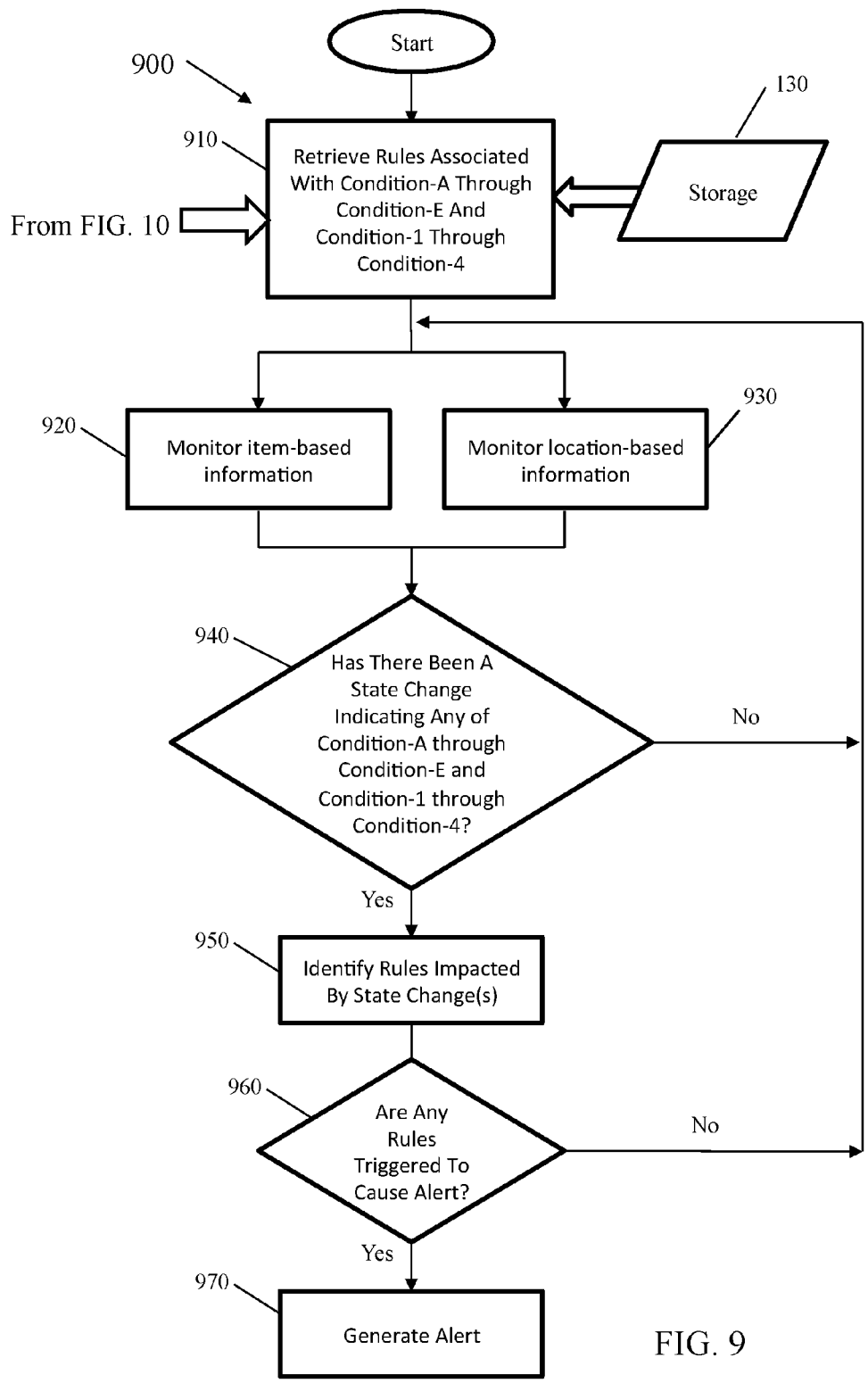
FIG. 9 shows, in simplified form, a process flow diagram for executing rules.

FIG. 9 shows, in simplified form, a process flow diagram for executing rules and shows a process 900. After rules associated with Conditions-A through Condition-E and Conditions-1 through Condition-4 are created and stored in storage 130, the rules may be retrieved from storage 130 (Step 910).

After the rules have been retrieved (Step 910), item-based information is monitored (Step 920) to determine if any of item-based conditions (1-4) are satisfied (Step 940). In parallel, location-based information is also monitored (Step 930) to determine if any location-based conditions (A-E) are satisfied (Step 940). If there has been no state change indicating that any of the item-based conditions (1-4) or location-based conditions (A-E) have been satisfied, then the process continues monitoring the item-based information (Step 920) and location-based information (Step 930) until a condition is met.

In the event that it is determined in Step 940 that a particular item-based condition (1-4) and/or location-based condition (A-E) had been met, then any rules impacted by the state change(s) are identified (Step 950) and it is determined whether any of the identified rules are triggered to cause an alert (Step 960). In addition to any state changes for item-based conditions (1-4) and location-based conditions (A-E), determining whether any of the identified rules are triggered in Step 960 may also consider any additional conditions applicable to the identified rules, such as (but not limited to) whether any temporal conditions (e.g., day of the week, date, time, etc. are satisfied) for when the rule is applicable are satisfied. If none of the identified rules are triggered to cause an alert, then the process returns to monitoring item-based information (Step 920) and location-based information (Step 930). If, however, one or more of the identified rules are triggered to cause an alert in Step 960, then an alert is generated (Step 970).

While it is anticipated that alerts would predominantly be issued to the user with the tool 100A in his possession, it is also anticipated that alerts could be issued to others such as (but not limited to) friends and family. For instance, someone walks away leaving their keys in their locked car. In this particular case, it might be useful to notify a list of others, who potentially have a set of spare car keys.

Additionally, while it is anticipated that the tool 100A will provide timely alerts to situations, alerts will also be logged as a history in the event someone needs to review them. Possibly to find out where and when an item was last in their possession. For example, a salesperson may want to know at which vendor he left the product sample and could review the alert history and see that an alert that was issued when the salesperson left XYZ Company without all of the products that he entered with.

Aside from the ability to execute rules, the tool 100A includes a powerful feature, which is the ability to create rules based upon information supplied by an external service (e.g., when booking a fight, a hotel, hiring a driving service, etc.). In such a case, if the external service is able to share location-based information, then rules related to arrival and departure from these locations can be generated, which the end user can have the ability to accept, reject or modify.

For example, when booking a flight, a rule can be automatically generated that when a user leaves the house within a pre-defined window before the flight, all items with the user need to not only arrive at the airport, but also need to be with the user when the user leaves the destination airport. Within the rules generated could also be sub rules related to checked bags at the check-in counter, use of an airport lounge, at the terminal, on the plane, and then reuniting with checked bags at the user's destination (including baggage proximity alerts when the user's baggage is in close proximity to the user on the carousel). In this particular case, if the airline was able to share at least information related to the available position indicators (but ideally the expected date and time of each activity), the rules could be automatically generated to coincide with the planned travel.

Another example of an external service would be that of connecting to someone's electronic calendar service. Calendars include a person's schedule of activities, which often include date, time and location. Using reverse geo-coding (or location sensor information if known), address information could be utilized to automatically generate rules based upon arrival and departure at a particular location.

Figure 10:
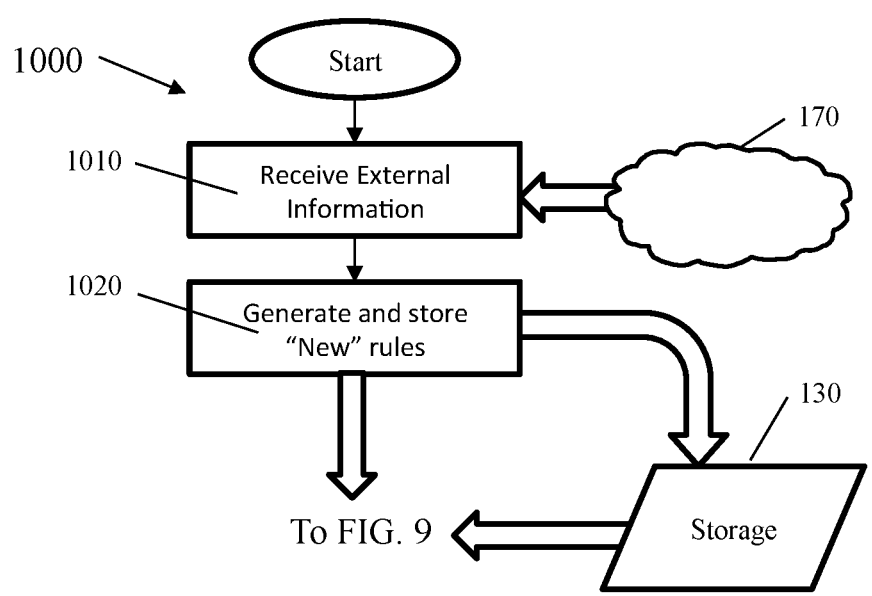
FIG. 10, shows, in simplified form, the modification of the process in FIG. 9 to include rule generation.

As such, the rules generated could be based on any of the location-based Condition-A through Condition-E. To this end, FIG. 10, shows, in simplified form, the modification of the process in FIG. 9 to include rule generation. FIG. 10 shows a process 1000 that includes two additional steps, aside from the steps included in process 900 of FIG. 9. The additional steps are receive external information (Step 1010) through the network connection 170, and generate and store "New" rules (Step 1020) based on the information received, which includes, at a minimum, information related to positions.

Some of the ways the external information could be obtained is through the use of APIs either by the third party accessing the tool's data storage or by the tool acquiring the information through accessing the third party's APIs. Other techniques include direct entry by the third party into a web-based service linked to the tool through the network 170. The point being not the specific manner that the information is entered, but that external information is able to be received by the tool in order that rules may be generated related to locations.

As discussed above, temporary rules may be established to permit the user to keep track of personal items in temporary locations not owned by the user (e.g., hotel room, taxi, reserved car service, airport gates, rental cars, etc.). In these temporary locations, temporary rules alert a user if monitored items that that the user arrived with are not with the user upon exit. For example, in the context of a reserved car service (e.g., Uber® or Lyft®), the user completes a reservation on a third party reservation system. The third party reservation system, as part of the reservation process, could create a rule request pertaining to the user's reservation that is transmitted to the user's tool 100A via network 170. The following information may be included with the rule request: date of reservation and the transmitter information (e.g., UUID, Major and Minor value of the transmitter) associated with the vehicle that is assigned to the user for that reservation date. Preferably, upon receipt of the rule request, the user's tool 100A displays a notification that a rule request has been received relating to the user's reservation. The software application 120 permits the user to either accept or reject the rule request.

If the user accepts the rule request, the software application 120 running on the user's tool 100A automatically creates and stores a temporary rule using the information provided in the rule request. The temporary rule includes the transmitter information associated with the assigned vehicle, the user's items to be monitored, and (optionally) an expiration date/time when the rule should expire (e.g., a predefined period after the expected arrival time at the user's destination). The software application 120 on the user's tool 100A monitors for the transmitter associated with the assigned vehicle. In the event that the user changes the reservation, the third reservation system transmits the updated information to the user's tool 100A via network 170, and the software application 120 updates the temporary rule as needed.

When the user enters the assigned vehicle with items being monitored under the temporary rule, then the temporary rule is activated. If the user leaves any of the monitored items in the assigned vehicle after the user exits, then the software application 120 generates an alert to the user (and optionally to a third party such as the driver of the assigned vehicle) that a monitored item may have been left behind. If an expiration date/time is provided, the software application 120 deactivates/deletes the temporary rule and stops monitoring for the transmitter associated with the assigned vehicle.

In the context of a hotel reservation, the user completes a reservation on a third party reservation system. The third party reservation system, as either part of the reservation process or, more likely, upon check-in at the hotel, could create a rule request pertaining to the user's hotel reservation that is transmitted to the user's tool 100A via network 170. The following information may be included with the rule request: checkout date and the transmitter information (e.g., UUID, Major and Minor value of the transmitter) associated with the hotel or hotel room assigned to the user. The transmitter is preferably set up as a "gate" and can be located in the hotel room, within the door lock of the hotel room, on the floor that that hotel room is on, in the main lobby of the hotel, or any other logistical setting for monitoring the user exiting the hotel room or hotel on the checkout date.

Upon receipt of the rule request, the user's tool 100A displays a notification that a rule request has been received relating to the user's hotel reservation. The software application 120 permits the user to either accept or reject the rule request. If the user accepts the rule request, the software application 120 running on the user's tool 100A automatically creates and stores a temporary rule using the information provided in the rule request. The temporary rule includes the transmitter information associated with the hotel or hotel room, the user's items to be monitored, and the checkout date. The software application 120 permits the user to edit the monitored items associated with the temporary rule.

The temporary rule is activated by the software application 120 on the checkout date. Once the temporary rule is activated on the checkout date, if the user passes through the "gate" of the hotel transmitter specified for the user's reservation without all of the user's monitored items, then the software application 120 generates an alert to the user (and optionally to a third party such as the concierge or front desk at the hotel) that a monitored item may have been left behind by the user. The software application 120 deactivates/deletes the temporary rule and stops monitoring for the hotel transmitter after the hotel checkout time (e.g., within a predefined time after the hotel checkout time).

It is understood that the examples provided herein are representative examples in which the tool 100A can be implemented to monitor items. Such representative examples are not intended to be exhaustive and the tool 100A is not limited to use solely with these examples.

Having described the tool 100 and its operation, a few illustrative screen shots are shown, in simplified form, in FIGS. 11A-11C. Referring to FIG. 11A, a user Log In screen 1100 permits the user to sign in to the system. When the user signs in, transmitter information is downloaded to the software application 120 and monitoring of the user's items commences. In FIG. 11B, an Available Items screen 1110 allows the user to select items 1112 to specify whether or not an item 1114 has an alarm 1118 associated with it. An item distance indicator 1116 is optionally shown on this screen. The alarm 1118 can be based on a rule associated with any of the Condition-1 through Condition-4.

In FIG. 11C, a Create an Alert by Location 1120 form can be used to select a location based on either the current location 1122, stored locations 1124, or a new location 1126. Once the location has been selected, the Condition-A through Condition-E to which the rule applies can be selected. The condition can then be applied to any of the available items through the Available Items 1110 sub-screen.

In yet another example embodiment, the tool 100 may be utilized to monitor personal items in an airport, train station, bus station, or other public transportation facilities. While not limited to use in airports, the operation of the tool 100 in a representative airport will be described below as one example of how the tool may be utilized to monitor personal items.

Some airports have begun to deploy transmitters 150, such as (but not limited to) iBeacon® transmitters, as a means for communicating with passengers. Due to its size, an airport may have hundreds of transmitters 150 deployed at various locations throughout the airport (e.g., baggage claims, check-in counters, airline gates, etc.). As discussed above, these transmitters 150 emit a unique signal that can be detected by, for example, software application(s) 120 executed by processor(s) 110 on tool 100 (e.g., mobile computing devices such as (but not limited to) smartphones, tablets, PDAs, etc.).

Figure 12A:
FIGS. 12A-12D illustrate, in simplified form, various screen shots of a GUI for a display screen on the tool for creating and storing rules associated with airports.
Figure 12B:
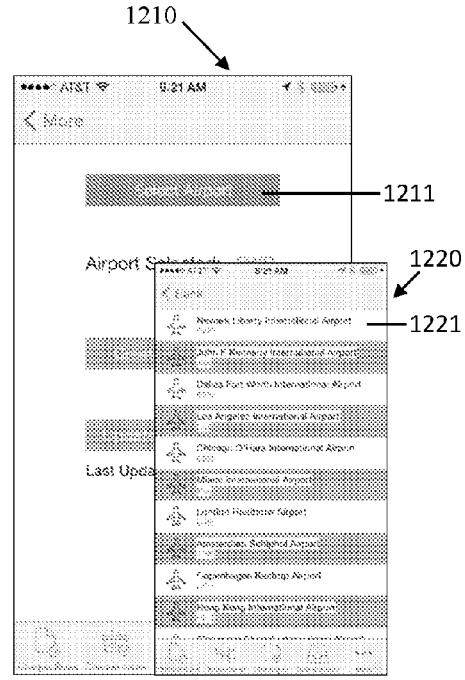

In the context of airports, temporary rules for monitoring personal items can be created using graphical user interfaces (GUIs) on tool 100. FIGS. 12A-12D illustrate various screen shots of a display screen on tool 100 that allow the user to create and store temporary rules associated with airports. Referring to FIG. 12A, the user may select the "Cheque™ Airport" button 1201 on GUI 1200 to create a temporary rule for a specific airport. The user then selects the "Select Airport" button 1211 on GUI 1210, which causes GUI 1220 to be displayed on tool 100 (FIG. 12B). GUI 1220 includes a list of airports from which the user may select a specific airport by selecting the button 1221 corresponding to the desired airport.

Figure 12C:
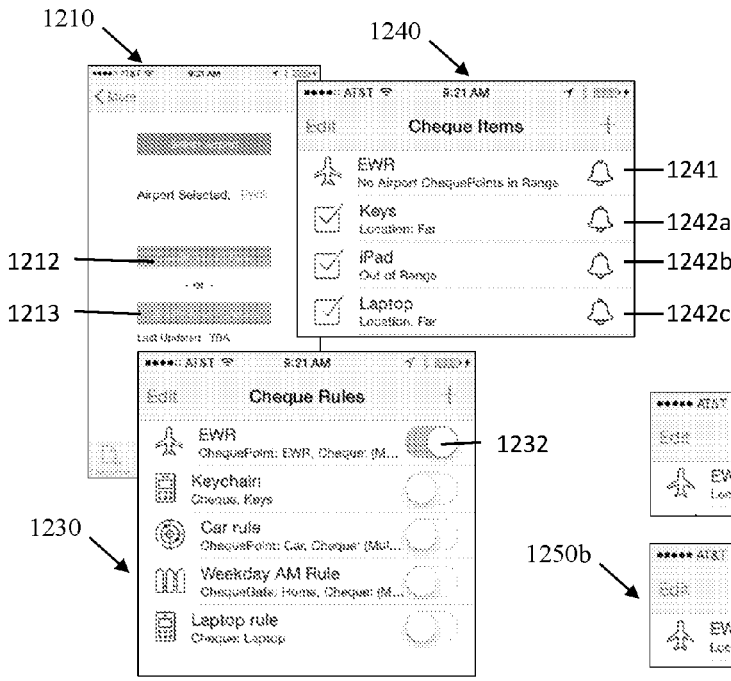

Referring to FIG. 12C, once the user has selected the desired airport, the user selects the "Create Airport Rule" button 1212 in GUI 1210. This causes the airport rule 1232 for the specific airport to be created and displayed on the "Cheque™ Rules" GUI 1230, as well as on the "Cheque™ Items" GUI 1240. In this example, the "Cheque™ Items" GUI 1240, shows the airport rule created 1241 (EWR) and the personal items ("Cheque™ Items") 1242*a*, 1242*b*, 1242*c*, etc. that the user wishes to monitor at the airport.

Figure 12D:
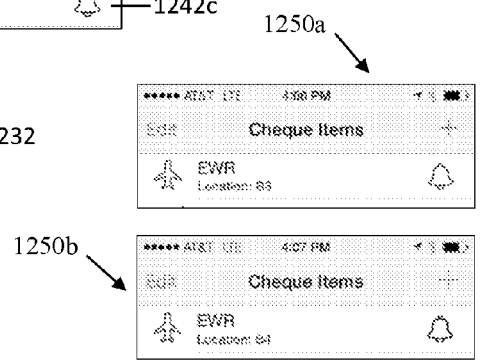

FIG. 12D illustrates location displays 1250a, 1250b that are displayed on tool 100, when in proximity to the transmitter corresponding to, for example, baggage claim B3, B4, respectively.

In one embodiment, selection of the "Create Airport Rule" button 1212 or the "Update Airport Details" button 1213 on GUI 1210 (FIG. 12C) causes the software application 120 running on tool 100 to initiate an API call to download transmitter information associated with the selected airport from a central airport transmitter database, such as, for example, SITA Labs' Common Use Beacon Registry. Alternatively, airport transmitter information obtained from a central database (e.g., Common Use Beacon Registry) can be stored (and periodically refreshed) in a cloud computing environment, a copy of which can be downloaded to tools 100 without the need for each instance of the app making API calls directly to the central database. The downloaded airport transmitter information may include the UUID of the airport and metadata associated with each transmitter (e.g., Major ID and Minor ID, transmitter name, etc.). In the case of the Common Use Beacon Registry, every transmitter in a specific airport shares the same UUID, but each transmitter also includes a Major ID (i.e., a value representing a section of the airport such as baggage claims, check-in counters, gates, etc.), Minor ID (i.e., a value uniquely associated with that transmitter), and a name (e.g., "B3" representing Baggage Claim 3, "B4" representing Baggage Claim 4, "C134" representing Gate C134, etc.). The Major ID identifies transmitters within sections of the airport (e.g., baggage claim or airplane gates) and the Minor ID is unique to each individual transmitter.

Once the UUID of the selected airport is downloaded to the tool 100, the software application 120 creates a transmitter region to monitor, using, for example, iOS Core location framework. Monitoring enables the software application 120 to identify when entry and exit of a region has occurred. Because of the large number of transmitters 150 and regions in a given airport, it may be desirable for the software application to monitor for just the UUID associated with all transmitters 150 at the specific airport. Any transmitter 150 having the UUID of the selected airport, regardless of the transmitter's Major ID and Minor ID, is monitored by the application 150 and treated as being within the same transmitter region. This allows for many transmitters 150 to be consolidated into one transmitter region (e.g., Newark Liberty International Airport), but causes the granular detail of the transmitter 150 to be lost upon entry and exit of the region. The absence of this granular detail prevents the software application 120 from identifying the exact location of the transmitter 150 within the airport.

As a result, in the context of airports or other venues having a large number of transmitters 150, the software application 120 running on tool 100 also performs a ranging operation to provide more granularity for location approximation than monitoring. Ranging identifies transmitters 150 in range of the receiver 140 on tool 100, and returns a list of those transmitters 150 and their respective UUIDs, Major IDs, and Minor IDs. Ranging is used primarily when the software application is in the foreground and active state, and within a monitored transmitter region. It requires more battery power of the tool 100 than monitoring since it is actively scanning for transmitters 150. For example, the software application 120 uses ranging when the "Cheque™ Items" tab 1240 is open on the tool 100 (FIG. 12C). When the user is actively viewing the "Cheque™ Items" tab 1240, ranging is turned on to get relative distance approximations (e.g., Immediate, Near, Far) for each item that is being monitored under the rule. When the user leaves the "Cheque™ Items" tab 1240, indicating that the user does not want to know distance approximations, the software application 120 may discontinue the ranging operation to preserve battery power of tool 100.

FIGS. 13A-13E illustrate representative examples of ranging in the context of an airport rule. FIG. 13A illustrates when the tool 100 is in range of a single baggage claim transmitter. In this example, user of tool 100 enters Baggage Claim area 3 with a laptop 150. The software application 120 running on tool 100 uses region monitoring to sense that the tool 100 has entered an airport region. The software application 120 may activate ranging, in background mode, just for the airport region 3 that the tool 100 has just entered. Once the software application 120, via an asynchronous callback, receives the first hit or result set from ranging, the software application 120 preferably stops ranging. The UUID, Major ID and Minor ID of the transmitter 150 associated with Baggage Claim 3 is recorded and stored in tool 100. Since the only airport transmitter in the received result set is the transmitter 150 for Baggage Claim 3 in this example, the software application 120 causes processor 110 to cross check the transmitter's UUID, Major ID and Minor ID against the airport transmitter database cache to retrieve the name of the transmitter (e.g., "B3") and store the retrieved name in storage 130 on tool 100. If the tool 100 exits the region 3 without the laptop 150, the software application 120, recognizing that tool 100 has left airport region 3, causes the processor 110 to look up the stored name of the region, and uses that name to display an alert on tool 100 to the user. If the user exits the region with the laptop 150, nothing happens since the airport rule was not violated.

FIG. 13B illustrates when the tool 100 is within range of transmitters for multiple baggage claims. Like the example above, a user of tool 100 enters the area of Baggage Claim 3 with a laptop 150. In this example, when ranging is activated upon entry of Baggage Claim 3, the transmitter associated with Baggage Claim 4 is also detected by the software application 120 running on tool 100. The software application 120 causes the processor to sort the two regions (Baggage Claim 3 and Baggage Claim 4) by closest relative distance to tool 100, and retrieve the name of the closest transmitter (e.g., "B3") from the cached database. If the tool 100 exits the region 3 of Baggage Claim 3 without the laptop 150, the software application 120 causes the processor 110 to generate an alert using the stored name ("B3") on tool 100. If the user exits the region with both tool 100 and laptop 150, nothing happens since the airport rule was not violated.

Referring to FIG. 13C, if the user of tool 100 exits the region 3 of Baggage Claim 3 and then enters the region of Baggage Claim 4, the process begins again. In this example, the transmitter associated with Baggage Claim 4 is now the closest transmitter to tool 100 and the software application 120 running on tool 100 uses that transmitter to retrieve the name of the closest transmitter (e.g., "B4") from the cached database. If the tool 100 exits the region 4 of Baggage Claim 4 without laptop 150, the software application 120 causes the processor 110 to generate an alert using the stored name ("B4") to the user. If the user exits the region 4 with both the tool 1000 and laptop 150, nothing happens since the airport rule was not violated.

FIGS. 13D and 13E illustrate when tool 100 detects overlapping baggage claim regions, which can occur due to the range of the transmitters and/or the close proximity of baggage claims to one another. When the user enters the region 3 of Baggage Claim 3, the transmitter name "B3" is retrieved from the cached database as in the examples above with respect to FIGS. 13A-13C. If the user walks through Baggage Claims 3 and 4 with both the tool 100 and laptop 150 behind, then no alert is generated by tool 100 since the airport rule was not violated. On the other hand, if the user leaves laptop 150 in the region 3 of Baggage Claim 3 (basically left the region of laptop 150, but still within the region of an airport transmitter), then another background range burst is performed by tool 100 once for the airport region. Baggage Claim 3 is still the closest transmitter, and thus "B3" is still the name to use for any future alert generated by tool 100. Even if the user ultimately exits through Baggage Claim 4, and no exit of Baggage Claim 3 was noted, the software application 120 will still highlight "B3" as the place laptop 150 was left behind. But, if the user forgets laptop 150 in the region 4 of Baggage Claim 4 as in FIG. 13E, the background range results will return "B4" as the name of the closest transmitter. Once the user exits region 4 of Baggage Claim 4 (the first exit event of the airport region even though the user walked through two Baggage Claim areas), the transmitter name "B4" will be used for the location in the alert generated by tool 100.

The present invention may be a system, a method, and/or a computer program product at any possible technical detail level of integration. The computer program product may include a computer readable storage medium (or media) having computer readable program instructions thereon for causing a processor to carry out aspects of the present invention.

Figure 14:
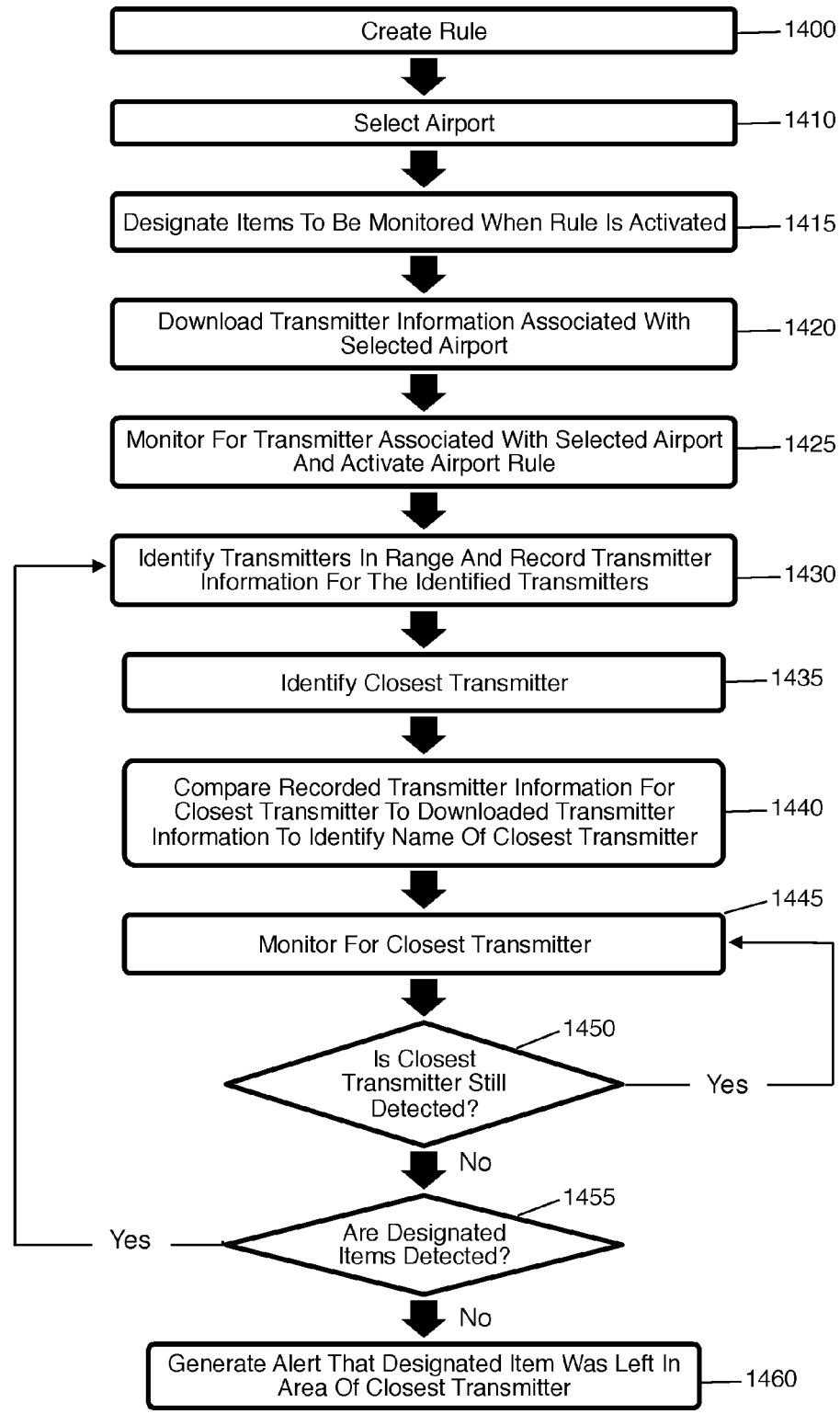
FIG. 14 is an illustrative flow chart of an example process for monitoring personal items within an airport.

FIG. 14 is an illustrative flow chart of an example process for monitoring personal items within an airport. As discussed in the examples above, a user of tool 100 may create a temporary rule to monitor the user's items at a specific airport (Step 1400). Using the tool 100, the user selects the desired airport (Step 1410) and designates the items that the user wishes to monitor when the rule is activated (Step 1415). Transmitter information associated with the selected airport is downloaded to the tool 100 (Step 1420). The download may be accomplished over a wireless network directly from a central transmitter database (e.g., Common Use Beacon Registry) or from a cloud computing environment.

A software application 120 executed by a processor 110 in tool 100 monitors for one or more transmitters associated with the selected airport and activates the airport rule created by the user when one or more transmitters associated with the selected airport are detected by the tool 100 (Step 1425). The software application 120 identifies the airport transmitters that are within range of tool 100 and records the transmitter information associated with the identified transmitters (Step 1430). As discussed above, the transmitter information may include a UUID, Major ID and Minor ID.

In Step 1435, the tool 100 identifies the closest transmitter of the airport transmitters identified in Step 1430 and compares the recorded transmitter information for the closest transmitter to the downloaded transmitter information to identify the name of the closest transmitter (Step 1440). The tool then monitors for the closest transmitter (Step 1445) and, if the closest transmitter is not detected (Step 1450), then the tool 100 monitors whether the designated items are within range of the tool (Step 1455). If all designated items are detected as being in range of tool 100, then the process returns to Step 1430 to identify transmitters in range of tool 100 and repeats the process until no airport transmitters are detected by tool 100.

If one or more of the designated items are no longer detected as within range of the tool 100 in Step 1455, then the software application 120 executed by the processor 110 causes an alert to be generated by the tool 100 (Step 1460). The alert may be a visual warning displayed to the user on tool 100, an audible warning generated by the tool 100, or a combination thereof. The alert may refer to the name of the closest transmitter, such as "Please Cheque™: Your laptop has been left behind at Baggage Claim 3."

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described and illustrated the principles of this application by reference to one or more example embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A tool for monitoring the presence of items, comprising:
    at least one receiver configured to receive information transmitted from at least two transmitters;
    one or more processors coupled to non-transient memory and the at least one receiver;
    a rule-based item co-location application comprising program instructions, stored in non-transient memory, that, when executed by the one or more processors, causes the one or more processors to:
        store in non-transient memory at least one rule relating to co-location of at least one item and the tool upon arrival at a future destination;
        receive location-based information transmitted from a first transmitter located in proximity to the future destination and determine that arrival at the future destination has occurred when the location-based information is received;
        in response to the determination that arrival has occurred, execute the at least one item co-location rule;
        receive item-based information transmitted from a second transmitter associated with the at least one item;
        in response to the determination that arrival has occurred, monitor for location-based information transmitted from the first transmitter and item-based information transmitted from the second transmitter;
        identify, based on the monitored location-based information, that the tool is no longer at the future destination when the tool is no longer receiving location-based information from the first transmitter;
        in response to identifying when the tool is no longer at the future destination, determine, based on the monitored item-based information transmitted from the second transmitter, whether the at least one item is co-located with the tool, wherein the at least one item is determined not to be co-located with the tool when the tool is no longer receiving item-based information from the second transmitter; and
        in response to the determination whether the at least one item is co-located with the tool, cause at least one alert to be generated if the at least one item is not co-located with the tool.

2. The tool of claim 1, wherein the first transmitter is one of a plurality of transmitters located in proximity to the future destination, and wherein the program instructions will further cause the one or more processors to determine, based on receipt of location-based information transmitted from the plurality of transmitters, which one of the plurality of transmitters is closest to the tool, the closest one of the plurality of transmitters being the first transmitter.

3. The tool of claim 2, wherein the program instructions will further cause the one or more processors to download from a database identification information for the plurality of transmitters and store the downloaded information in non-transient memory.

4. The tool of claim 1, wherein the at least one item co-location rule is automatically generated based upon receipt of data related to a pending arrival at the future destination.

5. The tool of claim 4, wherein the data comprises location identification information that can be used to determine arrival at the future destination.

6. The tool of claim 5, wherein the location identification information includes information identifying the first transmitter.

7. The tool of claim 4, wherein the data is received over a network from a reservation system.

8. The tool of claim 1, wherein the second transmitter is attached to one of the at least one items.

9. The tool of claim 1, wherein the at least one co-location rule also includes a temporal condition that must be satisfied before the at least one co-location rule is executed.

10. The tool of claim 9, wherein the temporal condition is at least one of a date of arrival or date of departure.

11. A computer-implemented method for monitoring the presence of items, comprising:
 storing, in non-transient memory coupled to one or more processors on a portable computing device, at least one rule relating to co-location of at least one item and the tool upon arrival at a future destination;
 receiving, using at least one receiver coupled to one or more processors and configured to receive information transmitted from at least two transmitters, location-based information transmitted from a first transmitter located in proximity to the future destination and determining that arrival at the future destination has occurred when the location-based information is received;
 in response to the determination that arrival has occurred, executing the at least one item co-location rule;
 receiving, using the at least one receiver coupled to the at least one processor, item-based information transmitted from a second transmitter associated with the at least one item;
 in response to the determination that arrival has occurred, monitoring, using the at least one receiver coupled to the at least one processor, for location-based information transmitted from the first transmitter and item-based information transmitted from the second transmitter;
 identifying, based on the monitored location-based information, that the tool is no longer at the future destination when the tool is no longer receiving location-based information from the first transmitter;
 in response to identifying when the tool is no longer at the future destination, determining, based on the monitored item-based information transmitted from the second transmitter, whether the at least one item is co-located with the tool, wherein the at least one item is determined not to be co-located with the tool when the tool is no longer receiving item-based information from the second transmitter; and
 in response to the determination whether the at least one item is co-located with the tool, generating at least one alert if the at least one item is not co-located with the tool.

12. The computer-implemented method of claim 11, wherein the first transmitter is one of a plurality of transmitters located in proximity to the future destination, the method further comprising determining, based on receipt of location-based information transmitted from the plurality of transmitters, which one of the plurality of transmitters is closest to the portable computing device, the closest one of the plurality of transmitters being the first transmitter.

13. The computer-implemented method of claim 12, further comprising downloading from a database identification information for the plurality of transmitters and storing the downloaded information in non-transient memory.

14. The computer-implemented method of claim 11, wherein the at least one item co-location rule is automatically generated based upon receipt of data related to a pending arrival at the future destination.

15. The computer-implemented method of claim 14, wherein the data comprises location identification information that can be used to determine arrival at the future destination.

16. The computer-implemented method of claim 15, wherein the location identification information includes information identifying the first transmitter.

17. The computer-implemented method of claim 14, wherein the data is received over a network from a reservation system.

18. The computer-implemented method of claim 11, wherein the second transmitter is attached to one of the at least one items.

19. The computer-implemented method of claim 11, wherein the at least one co-location rule also includes a temporal condition that must be satisfied before the at least one co-location rule is executed.

20. The computer-implemented method of claim 19, wherein the temporal condition is at least one of a date of arrival or date of departure.

21. A tool for allowing item co-location rules to be automatically generated based upon receipt of data related to a pending arrival at a future location, comprising:
 at least one receiver configured to receive information transmitted from at least two transmitters;
 one or more processors coupled to non-transient memory and the at least one receiver;
 a rule-based item co-location application comprising program instructions, stored in non-transient memory, that, when executed by the one or more processors, causes the one or more processors to:
  receive the data related to the future location, wherein the data comprises at least location identification information that can be used to determine arrival at the future location;
  automatically generate and store in non-transient memory a rule relating to co-location of at least one item with the tool in the event that arrival at the future location occurs at a future time;
  receive location-based information transmitted from a first transmitter located in proximity to the future location and determine that arrival at the future location has occurred when the location-based information is received;
  in response to the determination that arrival has occurred, execute the rule relating to item co-location;
  receive item-based information transmitted from a second transmitter associated with the at least one item;
  in response to the determination that arrival has occurred, monitor for location-based information transmitted from the first transmitter and item-based information transmitted from the second transmitter;

identify, based on the monitored location-based information, that the tool is no longer at the future location when the tool is no longer receiving location-based information from the first transmitter;

in response to identifying when the tool is no longer at the future location, determine, based on the monitored item-based information transmitted from the second transmitter, whether the at least one item is co-located with the tool, wherein the at least one item is determined not to be co-located with the tool when the tool is no longer receiving item-based information from the second transmitter; and in response to the determination whether the at least one item is co-located with the tool, cause at least one alert to be generated if the at least one item is not co-located with the tool.

* * * * *